Sept. 29, 1959     M. AUPHAN     2,906,637
METHOD OF FORMING A FILM A SHORT DISTANCE FROM A SURFACE
Filed Feb. 13, 1958     2 Sheets-Sheet 2

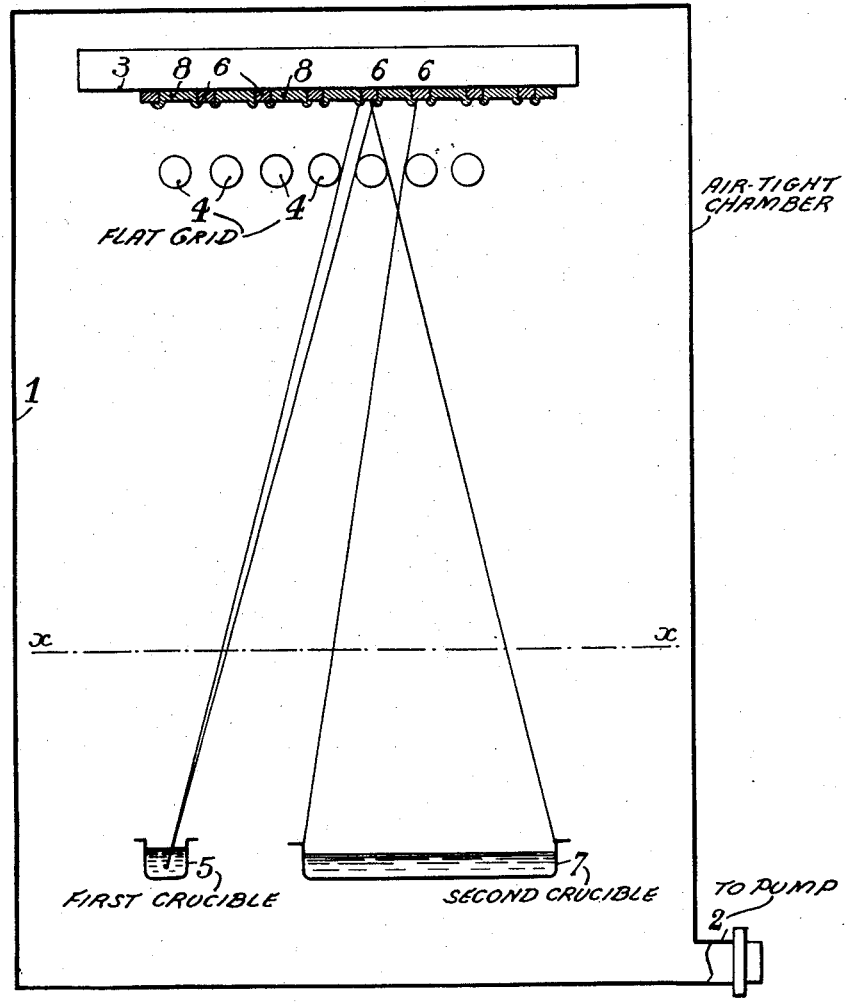

INVENTOR.
MICHEL AUPHAN
BY
ATTORNEYS

United States Patent Office 2,906,637
Patented Sept. 29, 1959

2,906,637

METHOD OF FORMING A FILM A SHORT DISTANCE FROM A SURFACE

Michel Auphan, Neuilly-sur-Seine, France, assignor to Societe Generale d'Electronique, Condamine, Monaco, a corporation of Monaco Application February 13, 1958, Serial No. 715,848

Claims priority, application France May 19, 1953

9 Claims. (Cl. 117—5.5)

This application is a continuation-in-part of the copending application Ser. No. 429,936 of Michel Auphan filed May 14, 1954, now abandoned.

This invention relates in general to the formation of stretched films and in particular, to a method of forming a stretched film spaced a short distance from a surface.

In carrying out the method of the invention, the surface adjacent which the film is to be formed is placed within an air-tight chamber which is connected to a pump for exhausting the air from the chamber. A flat grid made of parallel wires is stretched a short distance from the surface. This distance may be of the order of a few hundredths of a millimeter, by way of example, although the distance may be considerably varied without departing from the principles of the invention. One crucible containing a first substance is placed within the chamber at a relatively great distance from the surface. The first substance is then evaporated under vacuum through the flat grid and onto the surface. After the evaporation of the first substance, a second substance is evaporated under vacuum from a second crucible placed in the vicinity of the first crucible. The second crucible is much larger than the first crucible, at least in the dimensions which are parallel to the plane of the grid and run in a direction at right angles to that of the parallel wires constituting the grid.

After the two substances have been evaporated through the grid, the grid is removed. Then a third substance or substances preferably of a metallic nature, are evaporated over the entire surface, as well as over the two substances previously deposited by the first and second evaporations under vacuum. After the final deposition, the surface is heated to a degree sufficient to produce sublimation of the second substance deposited.

A preferred embodiment of the present invention is illustrated in the attached drawing in which:

Fig. 1 illustrates the apparatus of the invention, and

Fig. 2 illustrates a completed product showing the film stretched over strips on the surface which cause the film to be spaced a short distance from the surface.

Figure 3:
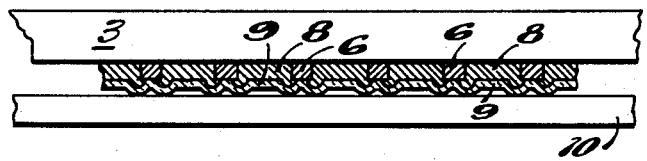
Figs. 3 through 6 illustrate successive stages of a variation of the process.

In the embodiment illustrated in Fig. 1, there is shown an air-tight chamber 1 to which a pump or other exhausting device is connected by means of a nipple 2. At the upper end of the chamber, as it is illustrated in Fig. 1, a surface 3 to be processed is shown schematically. At a suitable distance from the surface 3, a flat grid of parallel wires 4 is stretched, the plane of the grid being parallel to that of the surface 3.

A crucible 5 is placed in the chamber at a relatively large distance from the surface 3. The crucible itself is relatively narrow in the direction x—x in the plane of the drawing and it contains a first substance to be evaporated under vacuum. It will be noted that the narrow dimension of the crucible 5 is at right angles to that of the parallel wires 4 of the grid. As is well-known in the technique of vacuum evaporation, and further, because of the narrow dimension of the crucible 5 in the direction noted above, the first substance is deposited on the surface 3 in the form of a series of parallel strips 6 which are approximately equal in dimension.

After the parallel strips 6 are formed, a second evaporation is initiated. A second substance having the property of subliming at a temperature of the order of 450° C., which is lower than that of the first substance, is evaporated from a second crucible 7 which is placed adjacent the crucible 5. However, the dimensions of the second crucible 7 are very much greater in the direction x—x than that of the first crucible. In this instance, the position of the crucible 7 is such that the deposit of the second substance is effected on all parts of the surface which have not already been covered by the deposits 6. Actually, the arrangement of the crucible 7 is such that the deposits 8 of the second substance slightly overlap the parallel strips 6 as is illustrated in the drawing. However, as is also shown in the drawing, the central portions of the strips 6 are still maintained free from any deposit of the second substance.

After the two successive operations of evaporation are completed, the grid 4 is removed. After the removal of the grid 4, a third substance which is preferably of a metallic nature is evaporated under vacuum from a crucible which is not shown. Inasmuch as a deposit or deposits are to be made over the entire surface unmasked by a grid the position of the crucible containing the third substance is of no critical importance. The film 9 constituted by the deposit of a third substance or substances is composed of a layer or number of layers of metallic substances, one of which may form, for example, a reflecting layer at a face of the film.

After the completion of the third evaporation, the surface is heated to cause sublimation of the deposits 8 of the second substance evaporated onto the surface. With the sublimation of the deposits 8, the third substance assumes the form of a film 9 (see Fig. 2), stretched over the strips 6. In other words, spaced from the surface 3 at a short distance determined by the thickness of the strips 6, the film 9 is formed. The thickness of the strips 6, in practice, is usually of the order of a fraction of a micron. Hence, the film 9 is at a very slight distance from the surface 3.

Various substances have been used successfully in the depositions and numerous different dimensions and spacings of apparatus have been found suitable by applicant. For example, the first substance may be chosen from an extremely wide variety of substances, the primary qualification being only that the first substance shall be capable of being deposited by evaporation. As an example, and not to be taken in a limiting sense, silver may be used in the crucible 5 as the first substance evaporated. The second substance may, for example, be cadmium, mercuric iodide, ferric chloride, or arsenious anhydride. The third substance may advantageously be beryllium.

Insofar as the structure of the apparatus is concerned, the wires of the grid 4 may be of a diameter of .04 of a millimeter separated by intervening spaces of .02 of a millimeter. The grid may be spaced from the surface, taking the axis of the wires as the plane of the grid, by a distance of .11 of a millimeter. The crucibles 5 and 7 may be in the form of troughs of molybdenum. The dimension in the plane of the drawing of the crucible 5 is only a few millimeters, for example, 6 millimeters, and its length is of no importance in successfully carrying out the invention. Similarly, the width of the crucible 7 as shown in the plane of the drawing, may be of the order of 60 millimeters and its length perpendicular to the plane of the drawing is unimportant in practicing the invention.

With the dimensions specified, the distance between the midpoints of the crucibles should be approximately 41 millimeters to provide suitable deposits of the various substances. The spacing from the surface of the resulting film is then of the order of several hundreds of angstroms.

Several alternative methods of carrying out the process of the invention are feasible. In one of these alternative methods, the crucibles 5 and 7 are successively placed in the same position and the grid is moved laterally by a distance equal to half the pitch of the wires composing the grid. The direction of the movement is in the direction x—x between the first and second evaporations, and the masking effect of the grid remains much the same as in the first process described.

In another alternative method, the second evaporation is not carried out over all of the surface which is not covered by the strips. By way of example, it may be carried out through a grid placed at right angles to the direction in which the first grid was placed. In this way, there may be obtained a series of metallic strips deposited at right angles to the first series of strips. Such a cross-hatched deposition has useful applications in various television tubes, amongst other devices.

Figure 4:
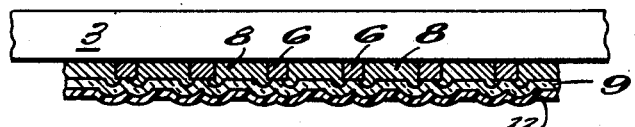
Figure 5:
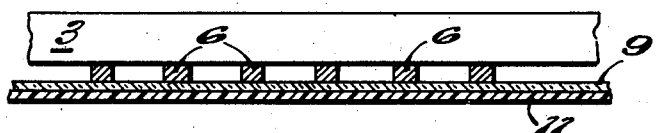
Figure 6:
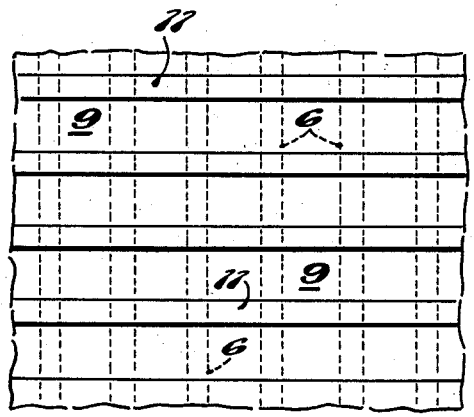

In a still further alternative method which is illustrated in Figures 3 through 6, the metallic evaporation is carried out over the entire surface as originally described, but to the film 9 another metallic layer 11 of greater thickness than the film 9 is added. The layer 11 is deposited through a grid placed at right angles to the original grid and the resulting total layer is thus made up of alternate thick and thin strips. Such a structure finds considerable use in various television applications utilizing light modulation.

This last method described differs from those previously described in that before the sublimation of the deposit 8, but after the deposition of the third substance 9, the grid originally used is removed. Then, a grid having wires 10 parallel to the surface 3 but perpendicular to the direction of the wires of the first grid is placed in contact with the film 9. Following the placement of the grid having wires 10, the deposition of the layer 11 is made in a manner similar to that of the first and second substances. Then the grid having wires 10 is removed, the deposit 8 is removed by sublimation and the total layer 9 and 11 becomes stretched substantially flat in the manner shown.

In addition to the various television applications mentioned, the invention also finds use generally in any applications where there is required a film spaced a short distance from a surface.

What is claimed is:

1. A method of forming a film slightly spaced from a surface, comprising disposing a crucible in front of said surface and in spaced relation thereto, disposing a grid between the crucible and the surface, the distance between the grid and the crucible being relatively great compared to the distance between the grid and the surface, the width of the crucible being relatively narrow compared to the width of the surface and the grid; drawing a vacuum on the surface, grid, and crucible, evaporating from the crucible a first substance to deposit the substance as strips on said surface; disposing a second crucible in a position laterally displaced from the first crucible, the second crucible being wider than the first crucible, drawing a vacuum on the surface, second crucible and grid, and evaporating from the second crucible a substance having a sublimation temperature lower than that of the first substance to deposit the second substance as strips on said surface between the strip of the first substance; removing the grid, disposing a third crucible at a distance from the surface, drawing a vacuum on the surface and third crucible, evaporating from the third crucible a substance having a sublimation temperature higher than that of the second substance, to deposit said third substance upon the strips of the first and second substances; and then heating the surface and substances to the sublimation temperature of the second substance.

2. A method of forming a film spaced a short distance from a surface which comprises the steps of placing a grid adjacent said surface, evaporating under vacuum a first substance through said grid onto said surface from a first point, evaporating under vacuum a second substance through said grid onto said surface and said first substance from a second point, said first and said second points being approximately equally spaced from said surface and separated one from the other, said second substance having a lower temperature of sublimation than said first substance, removing said grid, evaporating under vacuum a third substance onto said first and second substances, and heating the assembly of surface and evaporated substances to sublime said second substance leaving said third substance spaced from said surface by said first substance.

3. A method of forming a film spaced a short distance from a surface which comprises the steps of placing a grid adjacent said surface, vacuum depositing a first substance at a first angle through said grid on said surface, vacuum depositing a second substance at a second angle through said grid on said surface and on said first substance, said second substance having a lower temperature of sublimation than said first substance, removing said grid, vacuum depositing a third substance over said first and second substances, and subliming out said second substance to leave said third substance spaced from said surface by said first substance.

4. A method of forming a film spaced a short distance from a surface which comprises the steps of placing a grid adjacent said surface, vacuum depositing a first substance at a first angle through said grid on said surface, vacuum depositing a second substance at a second angle through said grid on said surface and on said first substance, said second substance having a lower temperature of sublimation than said first substance, removing said grid, vacuum depositing a third substance over said first and second substances, placing a second grid adjacent said third surface, said second grid having parallel wires running in a direction perpendicular to that of the wires of said first grid, vacuum depositing a fourth substance through said second grid, and subliming out said second substance to leave said third and fourth substances spaced from said surface by said first substance.

5. A method as defined in claim 4 wherein said third and said fourth substances are the same resulting in an alternately thick and thin layer spaced from said surface by said first substance.

6. A method as defined in claim 4 wherein said second substance is cadmium.

7. A method as defined in claim 4 wherein said second substance is mercuric iodide.

8. A method as defined in claim 4 wherein said second substance is ferric chloride.

9. A method as defined in claim 4 wherein said third substance is beryllium.

References Cited in the file of this patent

UNITED STATES PATENTS 2,644,208    Auphan _____ July 7, 1953